(12) United States Patent  
Liu

(10) Patent No.: US 8,045,706 B2  
(45) Date of Patent: Oct. 25, 2011

(54) SYSTEM OF EFFICIENTLY IMPLEMENTING SECURE HASH ALGORITHM (SHA-1) IN DIGITAL HARDWARE THAT ACCOMPLISHES OPTIMAL COMPUTATION SPEED USING MINIMAL HARDWARE RESOURCES

(76) Inventor: Yen-Fu Liu, Chungli (TW)

(*) Notice: Subject to any disclaimer, the term of this patent is extended or adjusted under 35 U.S.C. 154(b) by 1682 days.

(21) Appl. No.: 10/704,678

(22) Filed: Nov. 12, 2003

(65) Prior Publication Data

US 2004/0260740 A1    Dec. 23, 2004

(30) Foreign Application Priority Data

Jun. 19, 2003 (TW) .............................. 92116632 A

(51) Int. Cl.  
*H04K 1/00* (2006.01)  
*H04L 9/00* (2006.01)  
*H04L 9/30* (2006.01)

(52) U.S. Cl. ........................................................ 380/30

(58) Field of Classification Search .................... 380/30; 713/189  
See application file for complete search history.

(56) References Cited

U.S. PATENT DOCUMENTS

| | | | | |
|---|---|---|---|---|
| 2002/0066014 | A1* | 5/2002 | Dworkin et al. | 713/168 |
| 2003/0135743 | A1* | 7/2003 | Scheuermann | 713/189 |

OTHER PUBLICATIONS

Secure Hash Standard FIPS publication Aug. 1, 2000, pp. 1-19.*  
Kang et al., 2002 IEEE Asia-Pacific Conference on ASIC proceedings, August.*  
Alliance Core SHA-1 Processor Product Specification, Apr. 19, 2002.*  
IDT QuadMUX Flow-Control Devices, 2003.*  
"IDT Rolls out QuadMux Flow-Control Devices Data Flow Management", Embedded Star, Jun. 10, 2003.*  
Kang et al, 2002 IEEE Asia-Pacific Conference on ASIC proceedings August.*

* cited by examiner

*Primary Examiner* — Edan Orgad  
*Assistant Examiner* — Harris Wang  
(74) *Attorney, Agent, or Firm* — Lowe, Hauptman, Ham & Berner, LLP

(57) ABSTRACT

A method of completing the Secure Hash Algorithm (SHA-1) computation in exactly 81 clock cycles with digital hardware. The general implementation techniques include: using a combination of synchronous storage elements to store the required computation values and asynchronous circuits to perform all the logic and mathematic operations of each step of the 81-step SHA-1 computation within a single clock cycle; using a quad-output-channel 16×32-bit circular queue memory to store the 512-bit message segment (block), as a computation buffer of the Wt parameter, and to supply the Wt-3, Wt-8, Wt-14, and Wt-16 data parameters simultaneously; using a combination of a counter circuit and a decoder/encoder circuit to control selecting data parameters and sequencing the 81-step SHA-1 computation; and using an automated controller to control internal units that perform SHA-1 and allowing external systems to access the SHA-1 computation service. The robust architecture allows for a highly efficient digital hardware implementation.

13 Claims, 5 Drawing Sheets

SYSTEM OF EFFICIENTLY IMPLEMENTING SECURE HASH ALGORITHM (SHA-1) IN DIGITAL HARDWARE THAT ACCOMPLISHES OPTIMAL COMPUTATION SPEED USING MINIMAL HARDWARE RESOURCES

BACKGROUND OF THE INVENTION

1. Field of the Invention

The present invention relates to the transmission of data which require integrity assurance, data authenticity verification, or to generate a condensed version—or the "fingerprint"—of a message. In particular, a system and method of digital hardware resources of the FIPS PUB 180-1 Secure Hash Algorithm (SHA-1) that can complete each SHA-1 computation step in a single clock, therefore, completing the SHA-1 on each 512-bit message segment in just 81 clocks.

2. Description of Related Arts One-way hash functions and the related algorithms can be used to address the issues of data integrity assurance, data authenticity verification, or generating a condensed "message digest" or "fingerprint" representation of a message. The Secure Hash Algorithm (SHA-1) is designed to produce, with very high probability, a unique 160-bit message digest for any message. When combined with DSA (Digital Signature Algorithm, FIPS PUB 186), the SHA-1 can assist in detecting unauthorized alteration of a message sent over a network by verifying the received signature—which was computed with the message digest of the original message—against the signature computed with the message digest of the received message. The following is quoted from FIPS PUB 180-1: "SHA-1 is called secure because it is computationally infeasible to find a message which corresponds to a given message digest, or to find two different messages which produce the same message. Any change to a message in transit will, with very high probability, result in a different message digest, and the signature will fail to verify".

Past practices of implementing SHA-1 in software have the disadvantage of slow performance; large amount of software codes must be used to perform computation, manage system resources, control program flow, and generating and reusing working data. Taking the case of an expression TEMP=$S^5$(a)+Ft(b,c,d)+e+Wt+Kt, each logical operation may take-up several instructions, more than a hundred clock cycles could be required just to process this single expression by software.

SUMMARY OF THE INVENTION

The main object of the present invention is to provide a digital hardware embodiment of SHA-1 which offers maximum performance of the algorithm using minimal hardware resources.

In order to accomplish the performance goal, the hash computation for a 512-bit message segment must complete in no more than 81 clocks. As specified in FIPS PUB 180-1, there are 81 steps in the SHA-1 computation. The hash computation starts with a 160-bit value which is composed of five 32-bit variables; these five variables are either chaining variables that were initialized prior to processing the first 512-bit message segment or the final result of the computation of the previous 512-bit message segment. SHA-1 uses these five variables to start processing a 512-bit message segment in 80 steps of hash computation to turn the five variables into a new 160-bit value. The 160-bit value is then added to its initial 160-bit value in the final step ($81^{st}$ step) of SHA-1 to create a final 160-bit hash of all the message segments that have been processed up to this point.

The instrumentalities of the present invention include the method of:

1. Implementing two sets of five 32-bit synchronous registers. One set—the SHA-1 Registers—to store the intermediate values given by each step of the 80-step hash computation performed on a 512-bit message segment. The other set—the Message Digest Registers—to buffer the starting 160-bit hash value till the $80^{th}$ SHA-1 computation step is done; then the value of the SHA-1 Registers are added to the Message Digest Registers and stored back to both register sets in the $81^{st}$ step of the SHA-1 computation.
2. Implementing an asynchronous circuit for processing the 80-step hash computation of a 512-bit message segment; each computation step will finish within the time period of one clock; the intermediate result of each step will be stored into the SHA-1 Registers and the stored values are fed back to the asynchronous computation circuit to be used by the next computation step.
3. Defining functions/constants, through which cyclic functions (Ft), constants (Kt), and chaining variables for the hash algorithm are initialized.
4. Implementing a 16×32-bit circular queue memory with circuits allowing simultaneous retrieval of data parameters $W_{t-3}$, $W_{t-8}$, $W_{t-14}$, and $W_{t-16}$.
5. Tracking, counting, and controlling the 81 steps of SHA-1 computation. The first 80 steps of SHA-1 are divided into four rounds—of 20 steps each—that use different Kt and Ft for computation. In addition, step 17 through 80 use $S^1$ ($W_{t-3}$ XOR $W_{t-8}$ XOR $W_{t-14}$ XOR $W_{t-16}$) instead of $W_t$ (used in step 1 through 16) in the computation.
6. Implementing circuits to perform logic and mathematic functions of SHA-1 using inputs of the previously mentioned functions (Ft), constants (Kt), data parameters (Wt), and SHA-1 Registers (a, b, c, d, and e).
7. Writing back the value of $S^1$($W_{t-3}$ XOR $W_{t-8}$ XOR $W_{t-14}$ XOR $W_{1-16}$) to the appropriate address in the 16×32-bit circular queue memory in steps 17 through 80 of SHA-1.
8. Start/stop SHA-1 computation and control initialization of the SHA-1 computation circuits.

The apparatus for accelerating SHA-1 computation in accordance with the present invention has a data storage unit, a computation unit, and a control unit. The data storage unit having four output channels serving both as the buffer for storing a 512-bit message segment and the buffer for saving the working results in the computation process of SHA-1. The computation unit—linked to the four output channels of the data storage unit for simultaneous retrieving of four data parameters—to complete SHA-1 on a 512-bit message segment within 81 clocks. The control unit to manage the computation unit, the data storage unit, and interfacing with external systems.

In summary, using the prescribed design implementation of SHA-1 with the ability to simultaneously retrieve four data parameters ($W_{t-3}$, $W_{t-8}$, $W_{t-14}$, and $W_{t-16}$) for the computation, along with the asynchronous computation circuits and the sequence control mechanisms, a SHA-1 computation on a 512-bit message segment can finish in only 81 clock cycles. Implementation of such architecture also results in a compact hardware structure requiring minimal use of circuit materials.

BRIEF DESCRIPTION OF THE DRAWINGS

The foregoing aspects and many of the attendant advantages of this invention will become more readily appreciated as the same becomes better understood by reference to the following detailed description when taken in conjunction with the accompanying drawings, wherein.

DETAILED DESCRIPTION OF THE PREFERRED EMBODIMENT

The present invention provides a detailed account of the system and methods to implement an optimal performance hardware solution to Secure Hash Algorithm (SHA-1) with minimal requirement of hardware resources. Since the principles and theory of SHA-1 are well-known skills in the prior art, the related topics will not be discussed in details. Persons skilled in the art can refer to FIPS PUB 180-1, the Secure Hash Standard, for more detailed information on SHA-1.

In the pre-computation process of SHA-1, a "message" (or a stream of data) of any length, preferably less than 264 bits, is first divided up into a plurality of "message segments" (referred to as a "message block" in FIPS PUB 180-1) of a specific length, such as a single 512-bit. If necessary, the message is padded to make the total length a plurality of the specific length. The computation process of SHA-1 deals with a single 512-bit message segment at a time. The SHAX is an implementation of this process without regard of the content of the 512-bit message segment or the higher level protocol.

Figure 1:
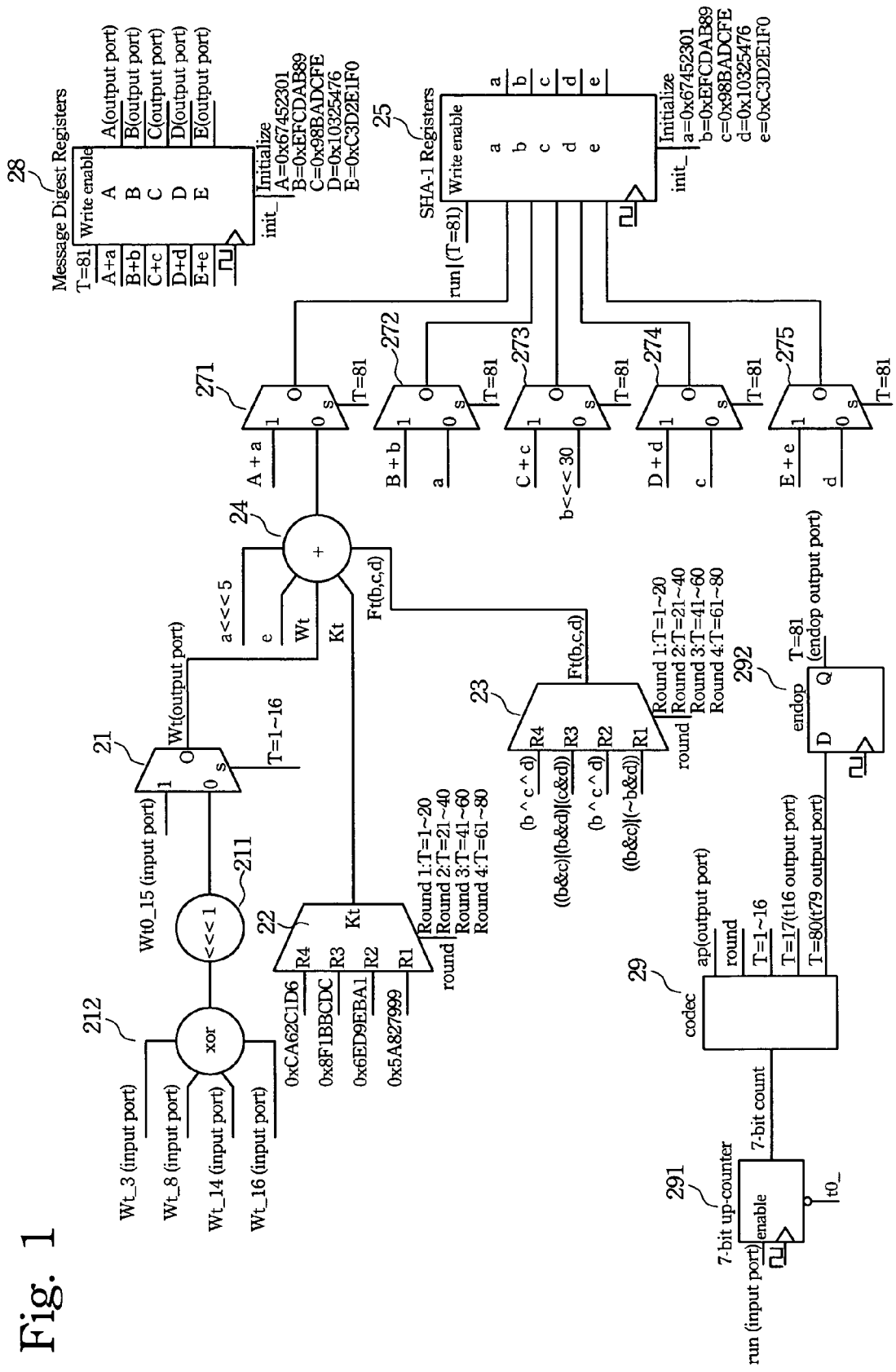
FIG. 1 is an architectural block diagram of the SHA-1 computation logic core in accordance with the present invention.

FIG. 1, the architectural block diagram of SHA-1 computation logic core, depicts the aforementioned SHA-1 computation process and completes advantageously this process in 81 clock cycles. For the ease of illustration, the SHA-1 computation process will be divided into two stages to be explained in more detail.

The first stage of SHA-1 computation includes 80 steps of computation, depicted as t=0~79 (or T=1~80). In each of the steps, a set of logic and mathematical operations are performed on a plurality of data parameters. The data parameters are: a, b, c, d, e, Wt, Kt, and Ft(b,c,d) and each of these data parameters will be described in more detail below.

The SHA-1 Registers (25) a, b, c, d, and e, such as 32-bit synchronous registers, provide the data parameters for SHA-1 computation, and serve as the storage for the computation result of each step at the same time.

Figure 2:
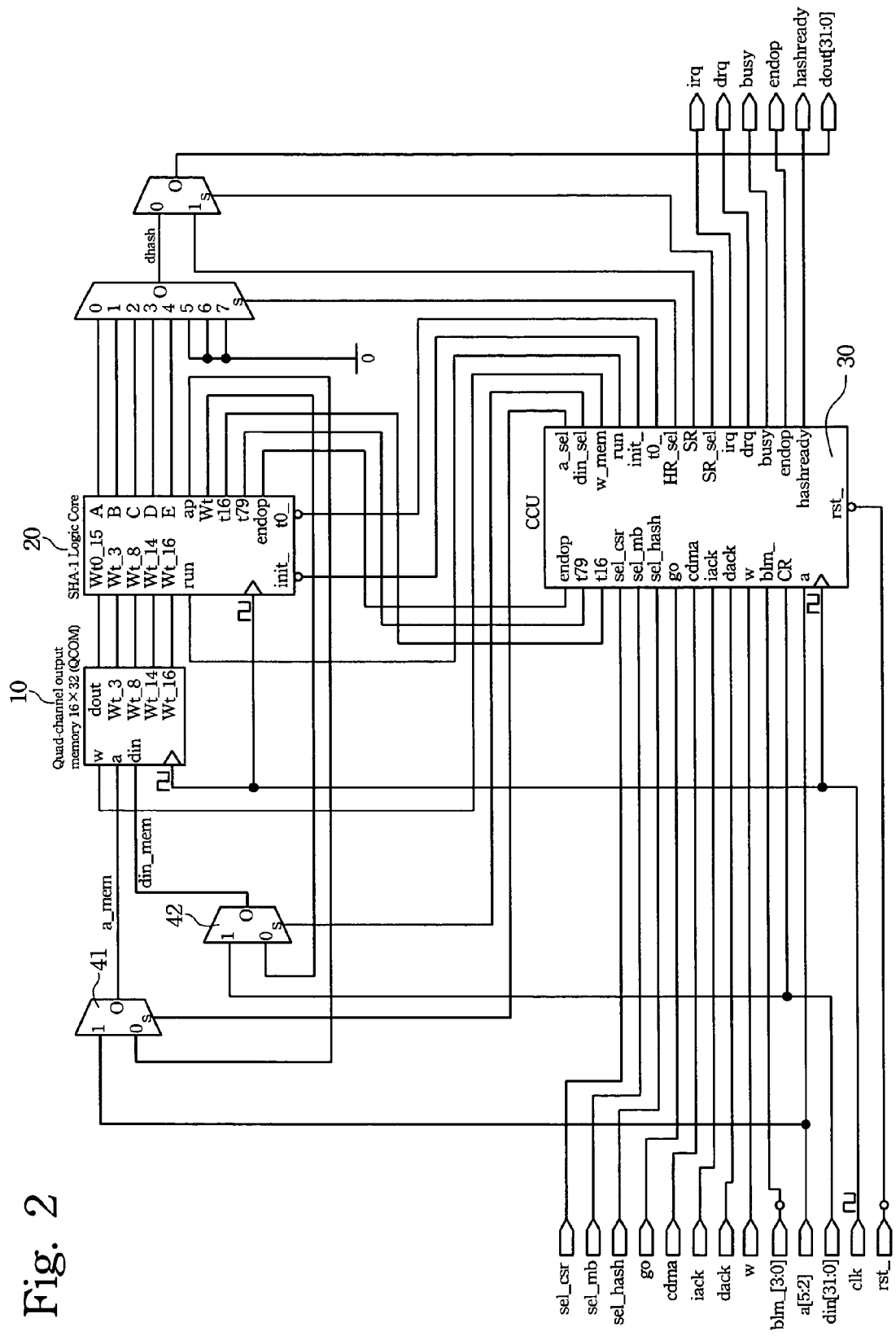
FIG. 2 is a block diagram showing the top schematic view of the Secure Hash Algorithm Accelerator (SHAX) in accordance with the present invention.

In addition, the SHA-1 Registers (25) and the Message Digest Registers (28) are both initialized to the chaining variables—only prior to processing the first message segment—with hex values: a=67452301, b=EFCDAB89, c=98BADCFE, d=10325476, e=C3D2E1F0, A=67452301, B=EFCDAB89, C=98BADCFE, D=10325476, and E=C3D2E1F0. This is controlled by the init signal coming from CCU (30) as shown in FIG. 2. Note that registers A, B, C, D, and E correspond to $H_0$, $H_1$, $H_2$, $H_3$, and $H_4$ as specified in the Secure Hash Standard (FIPS PUB 180-1); and registers a, b, c, d, and e are equivalent to the A, B, C, D, and E of Secure Hash Standard. Hardware implementation of the SHA-1 Registers and the Message Digest Registers can be D-flip-flops (DFF) with enable write controls and—depending on the bit value of the chaining variable bit position the DFF represents—asynchronous set or clear inputs. However, the implementation is not limited to using the aforementioned DFF, any other type of hardware that can perform the similar function can be implemented instead.

In the first stage of the SHA-1 computation (t=0 to t=79 or T=1 to T=80), the run signal (coming from CCU as shown in FIG. 2) enables writing to the SHA-1 Registers for 80 clocks; each of the computation steps is completed within one clock and the immediate result written into the SHA-1 Registers.

The Kt is a 32-bit constant and the Ft(b,c,d) is a logical function of the values of registers b, c, and d. The 80 computation steps of SHA-1 are divided into four rounds of 20 steps each round as specified in the Secure Hash Standard; each round of the computation uses a different set of Kt and Ft(b,c,d) values. The Kt and the Ft(b,c,d) of each round is defined as follows:

Round 1 (0<=t<=19)
Kt=5A827999
Ft(b,c,d)=(b AND c) OR ((NOT b) AND d).
Round 2 (20<=t<=39)
Kt=6ED9EBA1
Ft(b,c,d)=b XOR c XOR d
Round 3 (40<=t<=59)
Kt=8F1BBCDC
Ft(b,c,d)=(b AND c) OR (b AND d) OR (c AND d)
Round 4 (60<=t<=79)
Kt=CA62C1D6
Ft(b,c,d)=b XOR c XOR d In implementation, a Kt multiplexer (22) and a Ft(b,c,d) multiplexer (23) are being used for selecting the appropriate Kt and Ft(b,c,d) parameters in a computation step of the first stage. Selecting the appropriate round is controlled by a 7-bit up-counter (291) and the codec (29)—a decoder/encoder circuit.

Enabled by the run signal, the 7-bit up-counter (291) counts the computation steps from t=0 to t=79 (or T=1 to T=80 in FIG. 1). The t0_signal coming from CCU (30 in FIG. 2), resets the count at the end of each SHA-1 computation to zero.

The codec (29) encodes the 7-bit count of a computation step to a 2-bit round signal that represents accurately the round the computation step belongs to; and the round signal selects appropriate Kt and Ft(b,c,d) for a SHA-1 computation step through the Kt multiplexer (22) and the Ft(b,c,d) multiplexer (23). In addition, the codec (29) also outputs the lower four bits of the 7-bit up-counter (291) as the ap signal to be used by the quad-channel output memory (QCOM, 10) in FIG. 2 as the address pointer for Wt; and three additional signals: a signal—to be used by the Wt multiplexer (21)—representing t=0~15 (or T=1~16), t=16 (or T=17), and t=79 (or T=80) are also decoded from the 7-bit count.

Hardware of the Ft(b,c,d) logic functions of all the four rounds can be implemented with simple logic gates. The four Kt values for the four computation rounds can simply be "hardwired" values to go into the Kt multiplexer (22) inputs.

A 512-bit message segment to be processed with SHA-1 is divided into sixteen 32-bit words to be used in the computation. The Wt is a 32-bit data parameter from one of the sixteen 32-bit words of the 512-bit message segment buffer or a computation result of four of the stored 32-bit words from the same circular queue buffer.

From t=0 to t=15 (or T=1 to T=16), Wt is one of the sixteen 32-bit words of the 512-bit message segment undergoing SHA-1 computation. The 32-bit word selected corresponds to the 32-bit word in the QCOM (10 in FIG. 2) as pointed to by the address pointer signals ap from the codec (29). In other words, when t=0 (or T=1), the first word (W0) in QCOM is selected; when t=1 (or T=2), the second word (W1) is selected; and so forth, till the last word (sixteenth, W15) is selected and used in the computation.

From t=16 to t=79 (or T=17 to T=80), Wt is the result of a computation of four data parameters stored in QCOM (10 in FIG. 2): $W_{t-3}$, $W_{t-8}$, $W_{t-14}$, and $W_{t-16}$. It is the result of $S^1(W_{t-3}$ XOR $W_{t-8}$ XOR $W_{t-14}$ XOR $W_{t-16})$. The parameter Wt is involved in 80 sequences of SHA-1 computation from t=0 to t=79 (or T=1 to T=80). From the $17^{th}$ sequence (t=16 or T=17) to the $80^{th}$ sequence (t=79 or T=80), data of the $3^{rd}$, the $8^{th}$, the $14^{th}$, and the $16^{th}$ previous sequences ($W_{t-3}$, $W_{t-8}$, $W_{t-14}$, and $W_{t-16}$)—stored in the data buffer (QCOM, 10 in FIG. 2)—are retrieved to compute $S^1(W_{t-3}$ XOR $W_{t-8}$ XOR $W_{t-14}$ XOR $W_{t-16})$; this result is then stored back to the memory location of the current Wt sequence.

The logic function of $S^1(W_{t-3}$ XOR $W_{t-8}$ XOR $W_{t-14}$ XOR $W_{t-16})$ is implemented in two stages of an XOR logic circuit (212) performing the ($W_{t-3}$ XOR $W_{t-8}$ XOR $W_{t-14}$ XOR $W_{t-16}$) logic operations and a circular left shift device (211) to accomplish the $S^1$ operation. Any type of logic gates or circuits that can accomplish the XOR operations of four 32-bit parameters can be used to implement the ($W_{t-3}$ XOR $W_{t-8}$ XOR $W_{t-14}$ XOR $W_{t-16}$) function (212). The simplest way to implement the $S^1$ circular left shift device (211) is to connect bits 0 to 30 of the ($W_{t-3}$ XOR $W_{t-8}$ XOR $W_{t-14}$ XOR $W_{t-16}$) output (212) to bits 1 to 31 of the output of the $S^1$ function (211), and connect bit 31 of the ($W_{t-3}$ XOR $W_{t-8}$ XOR $W_{t-14}$ XOR $W_{t-16}$) output (212) to bit 0 of the output of the $S^1$ function (211). However, any other forms of implementation to accomplish the $S^1$ logical function asynchronously can be implemented instead. The present invention does not limit the implementation of any type of hardware that can accomplish the logic operations as specified.

A logic and mathematical computation is described in detail. The following first stage logical and mathematical computations of SHA-1 (t=0 to t=79 or T=1 to T=80) are performed; on each step of the 80-step computation:

TEMP=$S^5$(a)+Ft(b,c,d)+e+Wt+Kt is performed with a summing circuit (24).

e=d (275)
d=c (274)
c=$S^{30}$(b) (273)
b=a(272)
a =TEMP (271)

Again, hardware implementations of the methods in this invention are not limited. The summing circuit can be implemented with adders or any other types of circuits that can perform the function of summing five 32-bit parameters asynchronously. The $S^5$(a) and $S^{30}$(b) operations mentioned previously can be implemented with the same type of method as mentioned in the circular left shift one circuit (211).

Five multiplexers (271~275) along with the summing circuit (24) and the previous mentioned methods of controlling selection of the Wt (21), Kt (22), and Ft(b,c,d) (23) parameters performed all the first stage SHA-1 logical operations asynchronously; output of the multiplexers (271~275) are written into the SHA-1 Registers (25) synchronously from t=0 to t=79 (or T=1 to T=80); and this is how the first stage SHA-1 computation—from t=0 to t=79 (or T=1 to T=80)—can complete in exactly 80 clock cycles.

The second stage of SHA-1 computation is the $81^{st}$ step (and the final step) of the computation (t=80 or T=81). In this stage, the values of the SHA-1 Registers (25)—which are the computation results of the first stage SHA-1 computation (t=0 to t=79 or T=1 to T=80)—are added to the values of the Message Digest Registers (28)—which are the SHA-1 hash result of the previous message segment or chaining variables if the current message segment is the first message segment of a message; then the result is stored back into both the SHA-1 Registers (25) and the Message Digest Registers (28) to finish the $81^{st}$ step computation. The entire SHA-1 computation on a message segment is complete after the $81^{st}$ step, the resulting 160-bit hash value stored in both the SHA-1 Registers (25) and the Message Digest Registers (28) is ready to be used for the SHA-1 computation of the next message segment; or if the current message segment processed is the last message segment of a message, then the 160-bit hash result would be the final "message digest" of a message; this 160-bit value is available to external systems through the Message Digest Registers (28) output ports.

Five independent computations are performed:
A=a=A+a
B=b=B+b
C=c=C+c
D=d=D+d
E=e=E+e Each of the computations can be implemented with 32-bit adder circuits or any type of circuit that can accomplish adding two 32-bit values asynchronously.

When t=80 (or T=81) as signaled by the endop (292) register, both the Message Digest Registers (28) and the SHA-1 Registers (25) are enabled for storing the input values; the results of (A+a), (B+b), (C+c), (D+d), and (E+e) are stored into the Message Digest Registers (28) and stored into the SHA-1 Registers (25) through the five multiplexers (271275). All the above actions complete in the $81^{st}$ clock cycle of the SHA-1 computation; thus, the entire SHA-1 computation of a 512-bit message segment can complete in exactly 81 clock cycles.

FIG. 2 is a block diagram showing the top level architecture of the Secure Hash Algorithm Accelerator (SHAX) in accordance with the present invention.

The central control unit (CCU, 30) is the main controller of all the other major units and the interface to external systems. The following functions are performed by the CCU (30):

1. Taking commands and control signals from external systems.
2. Providing responses and status signals to external systems.
3. Perform internal actions and managing other units.
4. Managing internal and external data paths.

The following CCU signals are directly related to the control of SHA-1 computation, and will be described in more detail.

1. The run signal coupled to the SHA-1 Logical Core (20) enables performing the first stage SHA-1 computation (t=0 to t=79 or T=1 to T=80). The run signal is preferably generated with a Finite State Machine (FSM) and decoding logics internal to the CCU (30). The run signal is started by a command or a control signal from an external system, and cleared by the t79 (t=79 or T=80) signal coming out of the SHA-1 Logic Core (20) when the first stage computation finishes. The second stage SHA-1 computation (t=80 or T=81) is finished automatically within the SHA-1 Logic Core (20) without external control signals:

2. The init signal coupled to the SHA-1 Logic Core (20) initializes the Message Digest Registers (28 in FIG. 1) and the SHA-1 Registers (25 in FIG. 1) with the values of the chaining variables. The init signal is active when SHAX is reset by an external command or a reset signal; it is also active when all five of the Message Digest Registers (28 in FIG. 1) have been read by an external system (if the external system have retrieved the message digest then all message segments must have been processed).

3. The t0_signal coupled to the SHA-1 Logic Core (20) clears the 7-bit up-counter (291 in FIG. 1) at the end of each first stage SHA-1 computation (t=0 to t=79 or T=1 to T=80) and at anytime the system is in reset.

4. The din_sel and the a_sel signals coming out of the CCU (30) control the input data path multiplexer (42) and the address multiplexer (41). When SHAX is not performing SHA-1 computation, the two multiplexers (41, 42) direct the external input data and the external address into the QCOM (10) to allow external systems to load the QCOM (10) with a 512-bit message segment. During the SHA-1 computation, the internal data parameter Wt and the address pointer ap from the SHA-1 Logic Core (20) are directed to the QCOM (10) instead.

5. The signal t16 indicates the SHA-1 Logic Core (20) is performing the $17^{th}$ computation step (t=16 or T=17). The signal causes the CCU (30) to activate the w_mem signal which enables writing the Wt data parameter from the SHA-1 Logic Core (20) into the QCOM (10) at the address pointed to by ap. The w_mem signal is activated from t=16 to t=79 (or T=17 to T=80), value of Wt during this time is the result of $S^1(W_{t-3} \text{ XOR } W_{t-8} \text{ XOR } W_{t-14} \text{ XOR } W_{t-16})$.

The quad-channel output memory (QCOM, 10) is preferably a 16×3 2-bit circular queue memory buffer functioning as both the 512-bit message segment storage and the computation buffer for the Wt data parameter for t=16 to t=79 (or T=17 to T=80).

Figure 5:
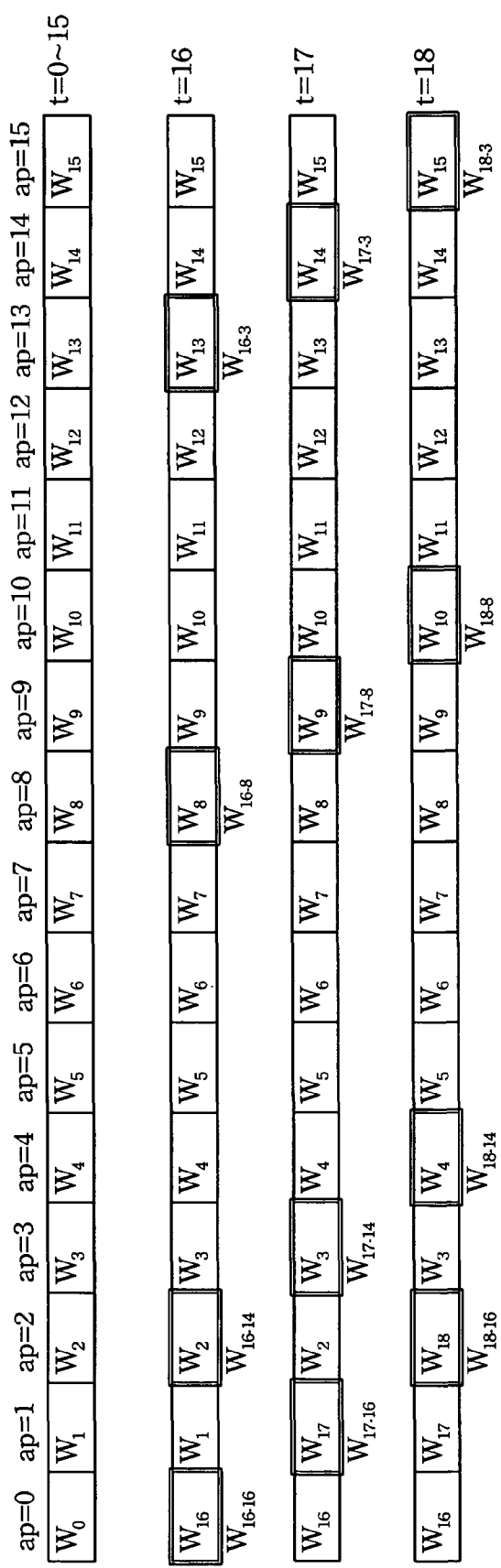
FIG. 5 is an illustration of the $W_{t-3}$, $W_{t-8}$, $W_{t-14}$, and $W_{t-16}$ data parameters selection in the memory buffer in accordance with the present invention.

From t=0 to t=15 (or T=1 to T=16), the 16×32-bit message segment stored in QCOM (10) is used directly by the SHA-1 Logic Core (20) for computation without modification. From t=16 to t=79 (or T=17 to T=80), however, the result of $S^1(W_{t-3} \text{ XOR } W_{t-8} \text{ XOR } W_{t-14} \text{ XOR } W_{t-16})$ must be stored back into the memory in each step. Since the QCOM (10) is a 16-word circular queue memory, the address pointer would circle back to zero for every sixteen sequences. For t=16 (or T=17), the result of $S^1(W_{t-3} \text{ XOR } W_{t-8} \text{ XOR } W_{t-14} \text{ XOR } W_{t-16})$ would be stored in memory word location 0 (W0); for t=17 (T=18), the result of $S^1(W_{t-3} \text{ XOR } W_{t-8} \text{ XOR } W_{t-14} \text{ XOR } W_{t-16})$ stored in W1; and so forth. The concept of this operation is illustrated in FIG. 5.

QCOM (10) also has four output data channels to supply SHA-1 Logic Core (20) with all four of the $W_{t-3}$, $W_{t-8}$, $W_{t-14}$, and $W_{t-16}$ parameters for the computation during t=16 to t=79 (or T=17 to T=80); this allows the $S^1(W_{t-3} \text{ XOR } W_{t-8} \text{ XOR } W_{t-14} \text{ XOR } W_{t-16})$ computed in the same clock cycle, thus, accomplishing the optimal SHA-1 computation performance of 81 clock cycles. Since $W_{t-6}$ is equivalent to $W_{t-0}$, this channel also supplies Wt to the SHA-1 Logic Core (20) for t=0 to t=15 (or T=1 to T=16). Details of the QCOM (10) design is illustrated in FIG. 3.

Figure 3:
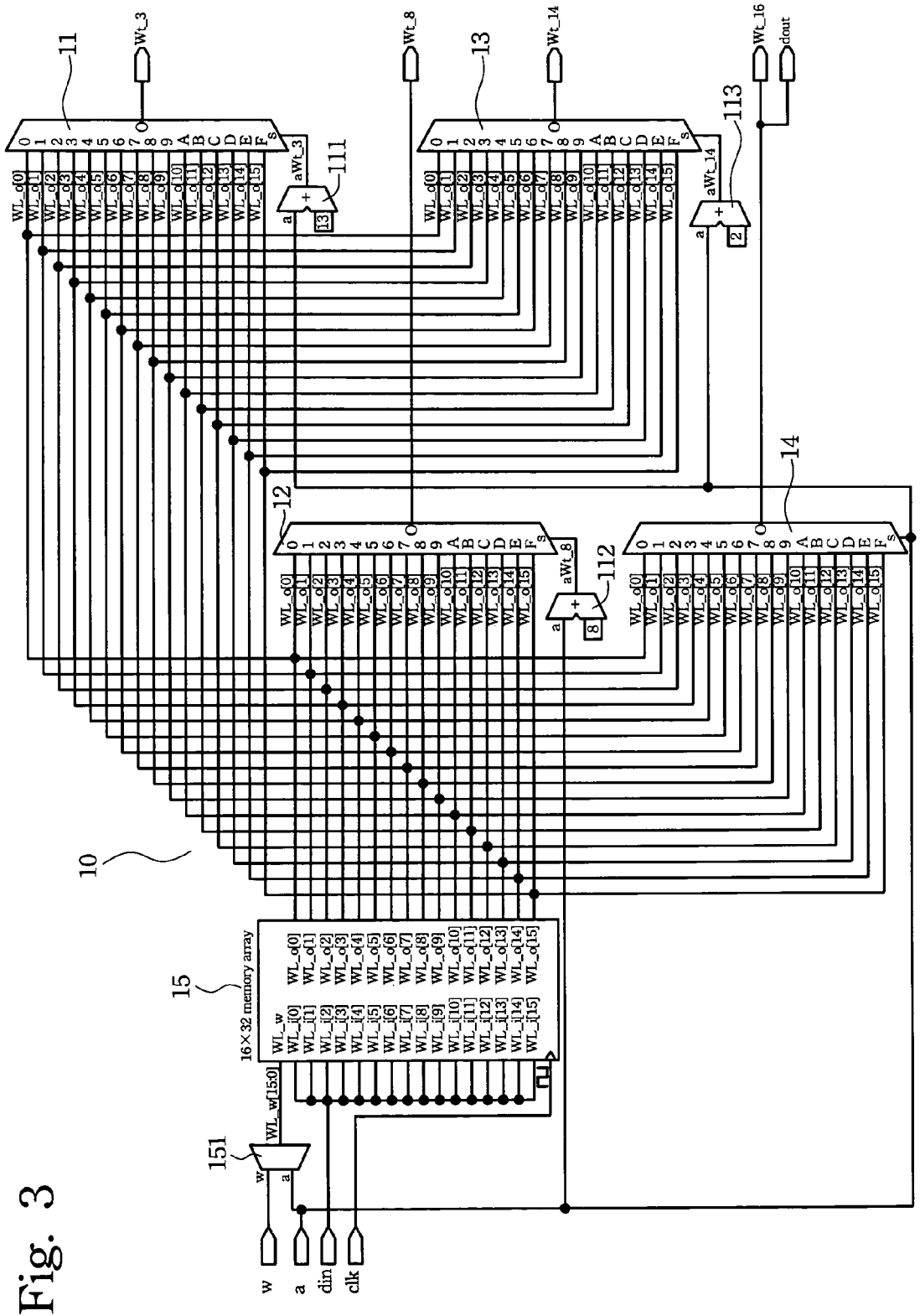
FIG. 3 is an architectural block diagram of the Quad-channel Output Memory (QCOM) in accordance with the present invention.

FIG. 3 is the quad-channel output memory (QCOM) architecture block diagram. The 16×32-bit memory array (15) is a storage unit with sixteen 32-bit words. The address decoder (151) decodes the 4-bit address lines (a) and the write enable signal (w) to make sixteen word-line-write signals for enabling the memory location pointed by the address lines for writing data into. The outputs of the sixteen memory words driving four 16-word input multiplexers (11, 12, 13, and 14).

Selecting $W_{t-3}$ is accomplished with implementing a 4-bit adder (111) adding 13 to the value of a (the address), and the output driving the select lines of the Wt_3 channel multiplexer (11).

Selecting $W_{t-8}$ is accomplished with implementing a 4-bit adder (112) adding 8 to the value of a (the address), and the output driving the select lines of the Wt_8 channel multiplexer (12).

Selecting $W_{t-14}$ is accomplished with implementing a 4-bit adder (113) adding 2 to the value of a (the address), and the output driving the select lines of the Wt_14 channel multiplexer (13).

The select lines of the Wt_16 channel multiplexer (14) are driven directly by the address lines (a) since $W_{t-16}$ is the same as $W_{t-0}$ for the 16-word circular queue memory. The Wt_16 channel multiplexer (14) is also driving two 32-bit output ports: Wt_16 and dout. The dout port is used by the SHA-1 Logic Core (20 in FIG. 2) during t=0 to t=15 (T=1 to T=16).

Using three 4-bit adders to dynamically calculate the address pointers of $W_{t-3}$, $W_{t-8}$, and $W_{t-14}$; and using four 16-word multiplexers to simultaneously supply all four of the $W_{t-3}$, $W_{t-8}$, $W_{t-14}$, and $W_{t-16}$ parameters to the SHA-1 Logic Core (20 in FIG. 2), allow the computation core (FIG. 1) to include $S^1(W_{t-3} \text{ XOR } W_{t-8} \text{ XOR } W_{t-14} \text{ XOR } W_{t-16})$ with the other data parameters to perform all of the asynchronous logic and mathematical operations in a first stage SHA-1 computation step in just one clock cycle; thus, a complete SHA-1 computation on a 512-bit message segment only takes 81 clock cycles.

Figure 4:
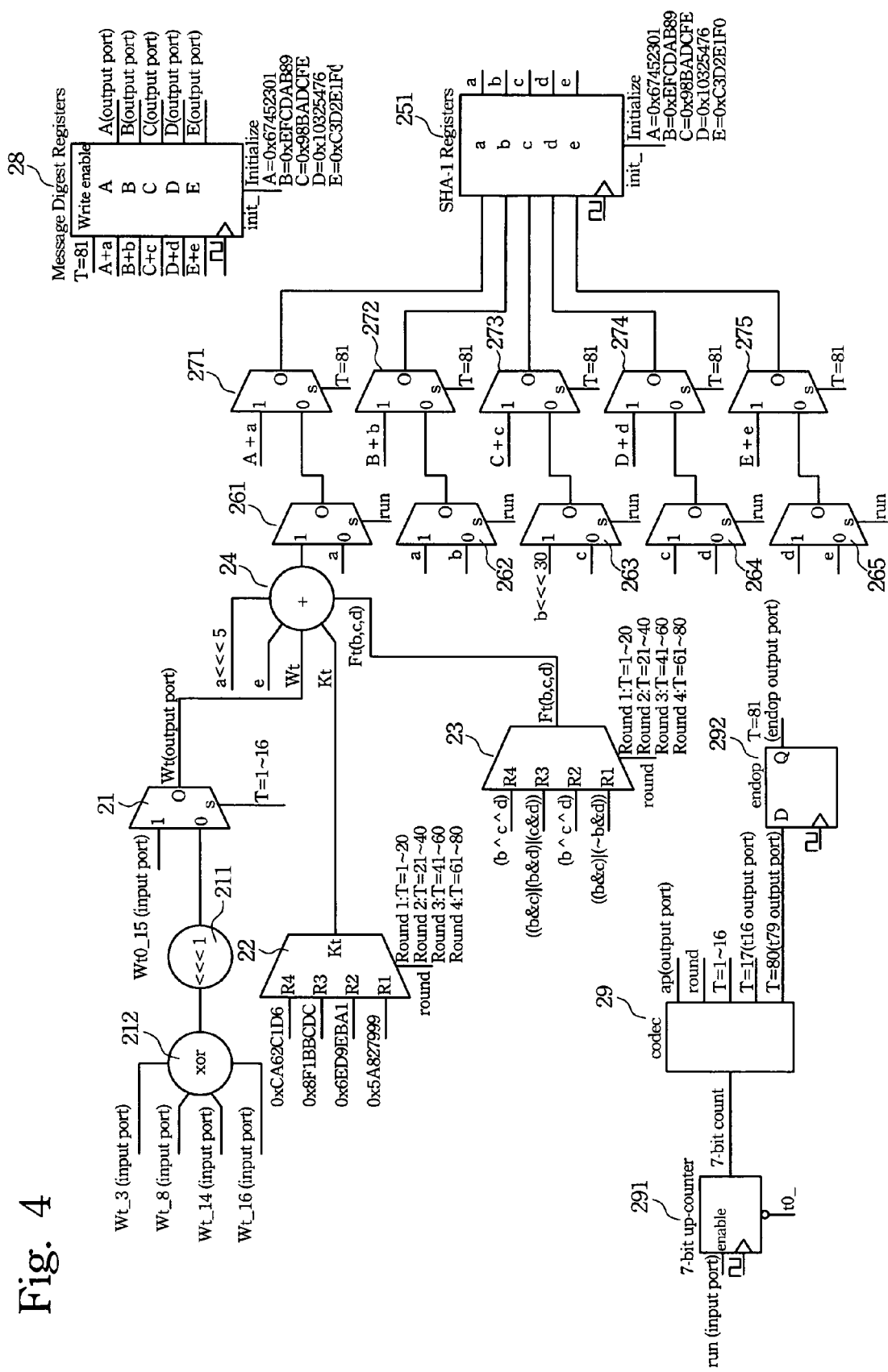
FIG. 4 is an architectural block diagram of an alternative implementation to the SHA-1 computation logic core in accordance with the present invention.

FIG. 4 shows an alternative implementation of the SHA-1 Logic Core (20 in FIG. 2). The differences between FIG. 4 and FIG. 1 are:
1. The SHA-1 Registers (251) has no write enable feature.
2. A set of five multiplexers (261~265) are added to the implementation.

The logic and mathematical functionalities of the SHA-1 Logic Cores shown in FIG. 4 and FIG. 1 are identical. The implementation of FIG. 4 is an alternative method when the hardware for implementing the SHA-1 Registers with the write enable feature (25 in FIG. 1) is not readily available, then using the five additional multiplexers (261-265) to enable storing the first stage computation results (t=0 to t=79 or T=1 to T=80) into the SHA-1 Registers (251)—using the run signal—are the better method.

In conclusion, the Quand-Channel Output Memory (QCOM) solved the issue of retrieving simultaneously the $W_{t-3}$, $W_{t-8}$, $W_{t-14}$, and $W_{t-16}$ data parameters; combined this feature with the asynchronous computation circuits and the sequence control mechanisms previously described in the SHA-1 Logic Core, a SHA-1 computation on a 512-bit message segment can finish in only 81 clock cycles. From looking at the architecture of the present invention, it is clear how the simplicity and the robustness of the design can lead to a very compact hardware implementation requiring minimal circuit materials.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A system of implementing the secure hash algorithm (SHA-1) for completing an 81-step SHA-1 computation in exactly 81 clock cycles, said system comprising:

an addressable quad-channel output memory (QCOM) having one data input channel and multiple data output channels for simultaneously retrieving multiple data elements from different memory locations referenced by an address value;

a SHA-1 Logic Core coupled to the multiple data output channels of the QCOM to receive necessary data for the 81-step SHA-1 computation; and a central control unit (CCU) coupled to both said QCOM and said SHA-1 Logic Core for controlling the 81-step SHA-1 computation and allowing an external system to access the 81-step SHA-1 computation;

wherein the SHA-1 Logic Core comprises:

a first synchronous registers set and a second synchronous registers set for storing the required computation values in the 81-step SHA-1 computation, wherein the second synchronous registers set is used to store the beginning value and the end value of a 160-bit hash value, and the first synchronous registers set is used to buffer intermediate computation values of the 160-bit hash value during the 81-step SHA-1 computation;

a combination of asynchronous circuits for performing the logic and mathematic operations of each step of the 81-step SHA-1 computation on stored parameters within one single clock cycle;

a counter circuit;

a decoder/encoder circuit and a register used together with the counter circuit for performing tracking, counting, and controlling the 81-step SHA-1 computation; and wherein the quad-channel output memory comprises:

an address decoder for decoding a 4-bit address signal and a write-enable signal to create a word-line-write signal with 16-bit according to the 4-bit address signal;

a memory array having sixteen 32-bit wide input word-lines all connected to a 32-bit wide data input channel, a 16-bit word-line-write input, a clock input, and a set of sixteen 32-bit wide output word-lines, wherein the 16-bit word-line-write input is connected to the output of the address decoder for receiving the word-line-write signal from the address decoder, and the clock input is connected to a clock signal, and the set of sixteen 32-bit wide output word-lines is commonly inputted to four 32-bit wide 16-input multiplexers which define the multiple data output channels of said QCOM; and at least three 4-bit adder circuits each having a first input connected to the 4-bit address signal to receive said address value, a second input hardwired to an offset value, and a 4-bit output connected to a 4-bit select input of one of the 32-bit wide 16-input multiplexers for causing the 32-bit wide 16-input multiplexer to output, to a corresponding input of the SHA-1 Logic Core, a 32-bit word stored in the memory array at an address defined by the address value plus the offset value.

2. The system of claim 1, wherein each of the first synchronous registers set and the second synchronous registers set comprises:

five synchronous 32-bit registers with write-enable inputs and asynchronous reset inputs.

3. The method of claim 1, wherein the combination of asynchronous circuits comprises:

a summing circuit for computing the sum of five 32-bit parameters (Wt, Kt, Ft(b,c,d), $S^5$(a), and e), wherein defined in the 81-step SHA-1 computation, wherein the parameters a, b, c, d and e are corresponding to A, B, C, D and E defined in the Secure Hash Standard (FIPS PUB 180-1);

a Kt multiplexer for selecting an appropriate parameter Kt during a computation round;

a Ft(b,c,d) multiplexer for selecting an appropriate parameter Ft(b,c,d) during a computation round;

a Wt multiplexer for selecting an appropriate Wt parameter between one of sixteen 32-bit words of a 512-bit message segment (block) or the output of $S^1(W_{t-3}$ XOR $W_{t-8}$ XOR $W_{t-14}$ XOR $W_{t-16})$;

a first circuit for performing the circular left shift one operation;

a second circuit for performing the operation of $(W_{t-3}$ XOR $W_{t-8}$ XOR $W_{t-14}$ XOR $W_{t-16})$;

a third circuit for performing the operation of $S^5$(a) with the output coupled to one of the 32-bit inputs of the summing circuit;

a fourth circuit for performing the operation of $S^{30}$(b) with the output coupled to one of the 32-bit inputs of a first two-input multiplexer;

four circuits for supplying 32-bit Kt constants which are 5A827999, 6ED9EBA1, 8F1BBCDC, and CA62C1D6 hex values for four computation rounds with corresponding inputs and outputs;

three logic circuits for supplying the Ft(b,c,d) of the four computation rounds with corresponding inputs and outputs, wherein Round 1 is (b AND c) OR ((NOT b) AND d); Round 3 is (h AND c) OR (b AND d) OR (c AND d); Round 2 and Round 4 are (b XOR c XOR d);

a set of five two-input multiplexers including the first two-input multiplexer for carrying out the logic operations of e=d, d=c, c=$S^{30}$(b), b=a, and a=TEMP, wherein the parameter TEMP is the output of the summing circuit; and for outputting the results of A+a, B+b, C+c, D+d, and E+e when counter t=80 (or step T=81); and five first adders for carrying out the mathematic operations of A+a, B+b, C+c, D+d, and E+e with the outputs coupled to the set of five two-input multiplexers and the inputs of the second synchronous registers set, wherein the parameters A, B, C, D and E are corresponding to $H_0$, $H_1$, $H_2$, $H_3$, and $H_4$ defined in the Secure Hash Standard (FIPS PUB 180-1).

4. The system of claim 3, wherein the counter circuit is a 7-bit up-counter with an asynchronous reset input and an enable count input, and the decoder/encoder circuit has an input coupled to the 7-bit count output; and the 7-bit count output, the decoder/encoder circuit and a D-flip-flop (DFF) are used together to generate control signals controlling the sequencing of the 81-step SHA-1 computation and selecting appropriate parameters in a computation step.

5. The system of claim 4, wherein, at step T=1~16 (counter t=0~15), the decoder/encoder circuit outputs a signal to the select input port of the Wt multiplexer, thereby selecting the source of the Wt parameter during each computation step;

the decoder/encoder circuit outputs a round signal to the select input ports of the Kt multiplexer and the Ft(b,c,d) multiplexer, thereby selecting one of the four Kt and Ft(b,c,d) parameter pairs to the relevant computation round;

at step T=81 (counter t=80), the D-flip-flop outputs a signal representing the 81st SHA-1 computation step and is coupled to the select inputs of the set of five two-input multiplexers, the D-flip-flop also enabling writing to the first synchronous registers set and the second synchronous registers set;

the decoder/encoder circuit outputs an ap (Address pointer) signal to an address multiplexer which directs external input data and external address into the quad-channel output memory, wherein the up signal is the lower four bits of a count number from the 7-bit up-counter;

at step T=17 (counter t=16), the decoder/encoder circuit outputs a signal representing the 17th SHA-1 computation step to the Central Control Unit; and at step T=80 (counter t=79), the decoder/encoder circuit outputs a signal representing the 80th SHA-1 computation step to the Central Control Unit.

6. The system of claim 4, further comprising:
an input data path multiplexer: and
an address multiplexer;
wherein the central control unit is used to interface with the external system and to provide a plurality of control signals to the 81-step SHA-1 computation, the control signals comprising:

a run signal activated by a control signal from the external system, and then deactivated by a t79 signal representing the 80th SHA-1 computation step (counter t=79 or step T=80) from the SHA-1 Logic Core, wherein the run signal enables the 7-bit up-counter and starts the sequence count, and enables writing to the first synchronous registers set, and the run signal is active from counter t=0 to counter t=79 (step T=1 to step T=80) for exactly 80 clock cycles;

an init_ signal initializes the first synchronous registers set and the second synchronous registers set with the value of SHA-1 chaining variables (hex values: 67452301, EFCDAB89, 98BADCFE, 10325476, C3D2E1F0), wherein the init_ signal is activated automatically when all of the synchronous 32-bit registers of the second synchronous registers set have been read by the external system or when the external system sends a reset signal;

a din_sel signal connected to the select input of input data path multiplexer to control selecting between the internal and the external input data;

an a_sel signal connected to the select input of address multiplexer to control the selection between the internal address and the external address, wherein both the din_sel signal and the a_sel signal are activated to select the internal address and data paths as the 81-step SHA-1 computation is active; and a w_mem signal for enabling writing to the quad-channel output memory, wherein the w_mem signal is active when the external system is writing to the quad-channel output memory and during the 81-step SHA-1 computation, and the w_mem signal is activated by a t16 signal indicating the SHA-1 Logic Core is performing the 17th computation step (counter t=16 or step T=17), and is deactivated by the t79 signal; and during the 81-step SHA-1 computation, the w_mem signal is active from the 17th computation step through the 80th computation step (counter t=0 to counter t=79 or step T=1 to step T=80) to allow storing the Wt parameter value into the memory location pointed by the ap signal.

7. A system of implementing the secure hash algorithm (SHA-1) for completing an 81-step SHA-1 computation in exactly 81 clock cycles, comprising:
SHA-1 Logic Core;
a quad-channel output memory (QCOM) having one data input channel and multiple data output channels for simultaneously retrieving multiple data elements from different memory locations referenced by an address value;

a first synchronous registers set and a second synchronous registers set for storing the required computation values in the 81-step SHA-1 computation, wherein the second synchronous registers set is used to store the beginning value and the end value of a 160-bit hash value, and the first synchronous registers set is used to buffer intermediate computation values of the 160-bit hash value during the 81-step SHA-1 computation;

a combination of asynchronous circuits for performing the logic and mathematic operations of each step of the 81-step SHA-1 computation on stored parameters within one single clock cycle;

a counter circuit;

a decoder/encoder circuit and a register used together with the counter circuit for performing tracking, counting, and controlling the 81-step SHA-1 computation; and a central control unit (CCU) for controlling internal units that perform the 81-step SHA-1 computation and allowing an external system to access the 81-step SHA-1 computation;

wherein the quad-output-channel memory comprises:
an address decoder decoding a 4-bit address signal and a write-enable signal to create a 16-bit word-line-write signal;

a 16×32-bit memory array with sixteen 32-bit words all connected to 32-bit input data-lines, a 16-bit word-line-write input connected to the output of the address decoder and the clock input connected to a clock signal;

a first 32-bit sixteen-input multiplexer, a second 32-bit sixteen-input multiplexer, a third 32-bit sixteen-input multiplexer and a fourth 32-bit sixteen-input multiplexer, each multiplexing all sixteen 32-bit word outputs of the 16×32 memory array to make four 32-bit wide data output channels;

a first 4-bit adder circuit with an input connected to the input address lines, the other input hardwired to an offset value of 13, and the 4-bit output connected to the 4-bit select input lines of the first 32-bit sixteen-input multiplexer to accomplish outputting the value of $W_{t-3}$;

a second 4-bit adder circuit with an input connected to the input address lines, the other input hardwired to an offset value of 8, and the 4-bit output connected to the 4-bit select input lines of the second 32-bit sixteen-input multiplexer to accomplish outputting the value of $W_{t-8}$; and a third 4-bit adder circuit with an input connected to the input address lines, the other input hardwired to an offset value of 2, and the 4-bit output connected to the 4-bit select input lines of the third 32-bit sixteen-input multiplexer to accomplish outputting the value of $W_{t-14}$; wherein there are 4-bit address lines connected directly to the 4-bit select input lines of the fourth 32-bit sixteen-input multiplexer to accomplish outputting the values of $W_{t-16}$ and $d_{out}$ used by the SHA-1 Logic Core during counter t=0 to counter t=15 (step T=1 to step T=16).

8. The system of claim 7, wherein the quad-output-channel memory unit simultaneously supplies the $W_{t-3}$, $W_{t-8}$, $W_{t-14}$, and $W_{t-16}$ data parameters to the SHA-1 Logic Core.

9. The system of claim 1, further comprising:
a set of five multiplexers for carrying out the feature of write-enable inputs for the first synchronous registers set, wherein the first synchronous registers set is composed of five synchronous 32-bit registers without write-enable inputs and with asynchronous reset inputs, and the second synchronous registers set is composed of five synchronous 32-bit registers with write-enable inputs and asynchronous reset inputs.

10. A system of implementing the secure hash algorithm (SHA-1) for completing an 81-step SHA-1 computation in exactly 81 clock cycles said system comprising:

An addressable memory device having one data input channel and multiple data output channels;

and a SHA-1 Logic Core coupled to both (i) the multiple data output channels for the memory device to receive necessary data for the 81 step SHA-1 computation and (ii) the data input channel of the memory device to return intermediate computation values during the 81-step SHA-1 computation to the memory device;

wherein within one operating clock cycle of the memory device, the data output channels of the memory device simultaneously output different memory words from different memory locations in accordance with a single address value at an address input port of the memory device;

and wherein said single address value is modified internally within said memory device to identify said different memory locations wherein the memory device further comprises:
a memory array;
a clock input port:
an enable-write input for, when activated, enabling data from the data input channel to be written into the memory array at a memory location referenced by the address value received at the address input port, wherein the data is written from the data input channel into the memory array within said one operating clock cycle of the memory device;

wherein the data output channels output simultaneously within said one operating clock cycle of the memory device, different memory words stored in the memory array at different locations referenced by different computed address values obtained by differently modifying the address value wherein the memory device further comprises multiple multiplexers each corresponding to one of the data output channels;

the multiplexers being commonly coupled to all memory word outputs of the memory array;

one of the multiplexers being configured to output a memory word stored at a memory location referenced directly by the address value at the address input port;

and each of the remaining multiplexers being configured to output a different memory word stored at a different memory location referenced by the respective computed address value obtained by modifying the address value received at the address input port.

11. The system of claim 10, wherein the memory device further comprises a number of adders each corresponding to one of the remaining multiplexers;

wherein each of the adders is coupled to the address input port to receive the address value and configured to add a different offset value to the address value to receive the computed address value for the respective one of the remaining multiplexers.

12. The system of claim 11, wherein the memory device comprises four said multiplexers and three said adders.

13. The system of claim 12, wherein the memory device is a Quad-Channel Output Memory;

the offset values of said three adders are 2, 8 and 13;

the four multiplexers simultaneously output the $1^{st}$, $3^{rd}$, $9^{th}$ and $14_{th}$ memory words stored in the memory array to inputs of the SHA-1 Logic Core;

the enable-write input port is activated from step 17 through step 80 of the 81-step SHA-1 computation.

* * * * *